United States Patent Office 3,201,917
Patented Aug. 24, 1965

3,201,917
PURIFICATION PROCESS FOR GASEOUS FORMALDEHYDE
Louis L. Wood, Clarksville, Md., assignor to W. R. Grace & Co., a corporation of Connecticut
No Drawing. Filed Apr. 5, 1962, Ser. No. 185,208
3 Claims. (Cl. 55—35)

The present invention relates to the purification and polymerization of formaldehyde. More specifically, the present invention relates to a process by which formaldehyde of exceptionally high purity is prepared and subsequently may be converted into a useful polyoxymethylene polymer.

It is generally known that numerous chemical processes which utilize formaldehyde, particularly polymerization processes, require an essentially monomeric form of formaldehyde which is substantially free of water. A common source of monomeric formaldehyde which is relatively low in water is obtained through the pyrolysis of low molecular weight formaldehyde polymers such as paraformaldehyde. Such pyrolysis yields a formaldehyde gas which contains as little as 5 to 10% water, however, for many uses is is desired to further reduce this water content.

The prior art shows numerous complex separatory procedures for further reducing the water content of formaldehyde obtained by the pyrolysis of paraformaldehyde which will yield a product having less than about 1% by water and in some cases as little as 0.1% water. While these prior art processes do produce a formaldehyde having acceptable purity for many purposes, the majority of these processes achieve success through the use of complex liquid-liquid or liquid-gas absorption procedures which are frequently coupled with still more complex separatory distillation procedures. Such processes require a great deal of equipment and the skill of numerous highly trained technicians to operate properly. Hence, the expense and time required to obtain substantially anhydrous formaldehyde is frequently considerable and often out of proportion when compared with the apparent value of the ultimate product. Furthermore, when the ultimate use of the formaldehyde involves the preparation of polyoxymethylene polymers, it is often found that the difficulties encountered in obtaining a uniformly high-quality formaldehyde monomer renders the production of a consistently high-quality polymer very difficult.

It is therefore an object of the present invention to provide a convenient and economical method for producing formaldehyde having a uniformly high degree of purity.

It is another object to provide a method for obtaining high-quality substantially anhydrous formaldehyde which is simple in operation and which requires a minimum of processing equipment.

It is a further object to provide a process for producing a high-quality polyoxymethylene polymer.

It is another object to provide a method by which low molecular weight formaldehyde yielding polymers may be conveniently and economically converted into a stable high molecular weight polyoxymethylene polymer.

These and still further objects of the present invention will become readily apparent to one skilled in the art from the following general description and detailed specific examples.

In general, the present invention contemplates a method for removing substantially all the water from a formaldehyde gas stream which involves contacting a formaldehyde gas with an anhydrous alkali metal salt of a sulfonated cation resin. Subsequently, in one embodiment of the invention, the substantially anhydrous formaldehyde gas may then be directly subjected to a variety of polymerization conditions, whereby the formaldehyde gas is converted into a high moelcular weight polyoxymethylene polymer.

More specifically, the present process for obtaining a substantially anhydrous formaldehyde comprises passing a relatively water-free formaldehyde gas stream containing a maximum of about 10% moisture through a column packed with a dried alkali metal sulfonated cation resin preferably maintained at about 50 to about 80° C. to prevent the condensation of the formaldehyde gas therein. Formaldehyde treated in this manner is found to contain less than about 0.01% by weight of water and is immediately available for further use in chemical processing.

In cases where the purified formaldehyde is to be polymerized, any one of a variety of polymerization systems may be used. The formaldehyde may be condensed and subjected to high energy ionizing radiation; such as high energy electrons and gamma rays, whereupon polymerization of the formaldehyde will occur. In addition to irradiation induced polymerization methods, numerous chemical catalytic systems may be used in conjunction with the purification process set forth herein. Systems using either cationic or anionic catalysts represented by the groups comprising alumina, hydrazinium compounds, alkaline oxides, and Lewis acids are but a few of the catalyst systems that may be effectively utilized.

Where it is desired to prepare a high-quality polyoxymethylene polymer, a representative method for polymerizing the formaldehyde involves conducting the treated formaldehyde gas directly from the alkali salt cation resin column to a polymerization kettle which is filled with a liquid polymerization medium maintained at a temperature of from about −50 to about +70° C. The formaldehyde gas is passed through the polymerization medium which is maintained in a well agitated condition until about 1% to about 10% by weight of formaldehyde based on the weight of the polymerization medium has been polymerized within the medium. At temperatures in the range of from about −50 to about +70° C. it is generally found that from about 1 to about 10 parts by weight formaldehyde are polymerized per part of polymerization medium in a period of from about 5 to about 100 minutes. The precise amount of polymerization occuring however, varies according to the type and configuration of equipment used, and numerous other empirical factors such as rate of formaldehyde addition, solvents used, etc. Hence, the specific operating conditions chosen for a particular process must be determined for each specific system under consideration.

The initially wet formaldehyde gas used in the practice of the present invention may come from any source. In general, however, it is preferred that the gas does not contain more than about 10% moisture in that larger proportions of water would rapidly saturate the alkali salt cation exchange resin and prevent economical use thereof. The initial water content of the formaldehyde, however, is not critical beyond economic considerations and not critical to the practice of the present invention. However, when the formaldehyde gas is found to contain more than about 10% of water, it is generally preferred that a crude separatory technique be used to reduce the water content into below about 10% before the formaldehyde is passed through the resin absorber.

A convenient and economical source of formaldehyde gas which may be used in the practice of the present invention may be readily obtained by pyrolyzing a low molecular weight formaldehyde polymer such paraformaldehyde at a temperature of from about 100 to about 200° C. The formaldehyde gas stream obtained from such a source will normally contain from about 5 to about 10% moisture and a relatively low concentration of other impurities such as formic acid and methanol. The formaldehyde gas may be conveniently swept from its pyrolyzation zone by a current of inert gas such as nitrogen which will also serve to sweep the formaldehyde gas through the remaining sections of the system.

After leaving the pyrolyzation chamber the formaldehyde is passed through a column with a dried alkali metal salt of a sulfonated cation ion exchange resin. Suitable resins may be described as alkali metal salts of sulfonated styrene-divinyl benzene copolymers having the basic strucual unit—

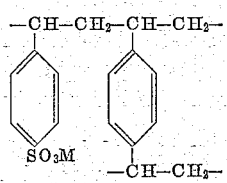

wherein M represents an alkali metal cation.

The cation resin bed is preferably maintained (along with all formaldehyde conduits leading thereto and therefrom) at a temperature of from about 50 to about 90° C. to prevent condensation of the gaseous formaldehyde. Although somewhat lower temperatures in the order of 25° C. may be used, the process will be complicated by the condensing product. Temperatures in excess of about 120° C. will cause regeneration of the resin (loss of water) and render the process ineffective.

The contact time of the formaldehyde gas with the resin will depend on arbitary factors such as the degree of dehydration desired, resin particle size, etc. Normally the flow rate is maintained at a level which will yield a desired degree of dehydration. This determination may be readily made by one skilled in the art.

Once the sulfonate cation resin has been saturated with water it may be conveniently regenerated by heating to a temperature of about 100 to about 150° C. at atmospheric pressure for a period of from about 0.5 to about 5 hours, depending on the resin particle size. Pressures below atmospheric pressure permits the use of a drying temperature as low as about 70° C.

After passing through the sulfonated cation bed, the dried formaldehyde gas may contain as little as one part per million water, and in one embodiment of the present invention may be passed directly into a polymerization zone.

In the representative polymerization system illustrated herein, the reaction medium found in the polymerization zone for the purpose of the present invention comprises an inert liquid such as liquid hydrocarbons having 3 to 10 carbon atoms per molecule including aliphatic hydrocarbons, cycloaliphatic hydrocarbons, and aromatic hydrocarbons plus from about .01% to about .05% of an alkaline polymerization catalyst such as primary, secondary, tertiary aliphatic and cyloaliphatic amines and primary aromatic amines dissolved therein.

Specific examples of hydrocarbons which may be used as reaction media are propane, butane, pentane, hexane, heptane, octane, decane, cylopentane, cyclohexane, methylcylohexane, 1,4-dimethylcyclohexane, cycloheptane, decahydronaphthalene, benzene, toluene, and xylene. Examples of the polymerization catalysts or initiators are methyl, ethyl, butyl, octyl, dodecyl, and octadecyl amines, dibutylamine, ethyloctylamine, tributylamine, dimethyloctadecylamine, cyclohexylamine, and aniline. In addition to the amine polymerization catalysts, the reaction medium may contain a polyoxymethylene stabilizer such as diphenylamine.

The dried formaldehyde gas is conducted into the medium at an even rate until about 1 to about 10% parts by weight of formaldehyde per weight of reaction medium has been polymerized within the medium. During the formaldehyde addition, the polymerization medium is maintained at a temperature of from about −50 to about +70° C. In general the polymerization will be found to have reached completion by the time the desired amount of formaldehyde has been added. This generally takes place in from about 5 to about 100 minutes depending on the rate of addition. A convenient method for determining the point at which sufficient polymerization has taken place for a given system is determined by finding the time required to obtain a polyoxymethylene polymer having a $N_{sp/c}$ greater than 0.7 deciliter/g. Subsequent to polymerization the polymer is recovered by filtration of the reaction mixture. Removal of residual reaction solvent is completed by washing the product with solvents such as acetone and subsequently drying at 70–100° C.

The polyoxymethylene polymers produced in accordance with the present invention will possess melting points in excess of about 170° C. The reduced specific viscosity ($N_{sp/c}$) of the polymers, as determined at 140° C. using 0.15% solutions in benzyl alcohol containing 1% diphenylamine and 0.05% N,N,N',N',-tetrakis(2-hydroxypropyl) ethylene diamine, is found to be greater than 0.70 deciliter/g.-l. The thermal stability of the polymers, as determined by observing the decomposition rate 222° C. ($K_{222}$) in a nitrogen atmosphere below 1% per minute.

Having broadly described the essential aspects of the present invention, the following specific examples are given to illustrate embodiments thereof.

*Example I*

A substantially anhydrous formaldehyde was prepared by charging a reaction vessel with 100 g. of paraformaldehyde and heating said formaldehyde to a temperature of 150 to 160° C. for 30 minutes. The formaldehyde gas which evolved was continuously swept out of the reaction vessel by means of an anhydrous nitrogen stream into a column containing 120 g. of an anhydrous potassium salt of a sulfonated styrene-divinyl benzene copolymer sold under the trademark Amberlite IR–120. The formaldehyde gas passing through the resin as well as the resin column was maintained at a temperature of 70–80° C. to prevent condensation of the formaldehyde thereon. The formaldehyde gas emerging from the resin column contained less than about 0.01% by weight of water.

*Example II*

The formaldehyde gas generated in Example I was introduced continuously beneath the surface of a well-stirred reaction media comprising 500 ml. anhydrous cyclohexane and 0.0408 g. diphenyl amine and 0.0836 ml. tri-n-butyl amine. The reaction media was maintained at a temperature of 29–34° C. while the dried formaldehyde gas, which evolved from 32 g. of paraformaldehyde, was introduced over a period of 30 minutes. After this time, the polymerization progressed to a point wherein a thick slurry of polyoxymethylene in the cyclohexane was formed. The reaction mixture was then filtered and the resultant solid polyoxymethylene polymer obtained was found to weigh 10.5 grams and represented a 33% yield. The polyoxymethylene possessed a melting point of 172–173° C., a reduced specific viscosity of 1.15, and a thermal stability constant ($K_{222}$ in $N_2$) of 0.66% per minute. The polyoxymethylene when pressed at 180° C. and 10,000 p.s.i. formed a tough continuous film. Inspection of the potassium salt resin showed only traces of polyoxymethylene had formed in the resin itself, and upon drying at 70–100° C. at 30 mm. pressure for 24 hours the resin lost 5.2 grams.

*Example III*

To illustrate the striking difference in the polymers which are obtained using wet and dried formaldehyde gas prepared in accordance with the present invention the following run was made. Equipment and conditions identical to that described in Example I were used except the column normally containing the potassium salt resin was left empty. The polymerization of the paraformaldehyde was continued for 30 minutes during which time 24 grams paraformaldehyde was decomposed. The polymerization conditions described in Example II were used and the formaldehyde gas evolved from the 24 grams of paraformaldehyde was found to yield 6.7 grams of a low molecular weight polyoxymethylene polymer. Its melting point was found to be 161–168° C., the reduced specific viscosity equal to 0.20, and the thermal stability constant ($K_{222}$) in nitrogen equal to 14.4% per minute. Attempts to press this polymer at 180° C. in 10,000 p.s.i. gave only discontinuous brittle masses.

It is seen from the above specific examples that substantially anhydrous formaldehyde gas may be conveniently and economically obtained by the practice of the present process. Furthermore, the above examples illustrate that by using a formaldehyde gas dried in accordance with the present invention with a polymerization process such as disclosed herein a high molecular weight stable polyoxymethylene polymer may be obtained.

I claim:

1. A method for removing water from formaldehyde which comprises contacting a water containing substantially gaseous formaldehyde containing less than about 10% water by weight with a substantially anhydrous alkali metal salt of a sulfonated cationic ion exchange resin which is non-reactive towards formaldehyde, and collecting a substantially anhydrous formaldehyde gas produced thereby.

2. The method of claim 1 wherein the temperature of the gaseous formaldehyde is maintained at from about 25° to about 100° C. to prevent the condensation thereof.

3. The method of claim 2 wherein the ion exchange resin is an alkali metal salt of a sulfonated styrene-divinyl benzene copolymer.

References Cited by the Examiner

UNITED STATES PATENTS

| | | | |
|---|---|---|---|
| 2,479,559 | 8/49 | Dolnick et al. | 260—340 |
| 2,768,994 | 10/56 | MacDonald | 260—67 |
| 2,780,652 | 2/57 | Gander | 260—616 |
| 2,841,570 | 7/58 | MacDonald | 260—67 |
| 3,030,338 | 4/62 | Aries | 260—67 |

FOREIGN PATENTS

| | | |
|---|---|---|
| 527,227 | 7/56 | Canada. |
| 598,930 | 5/60 | Canada. |
| 1,302,251 | 7/62 | France. |

OTHER REFERENCES

Cristy et al.: Chemical Engineering Progress, vol. 44, No. 6 (1948), pages 417–420.

WILLIAM H. SHORT, *Primary Examiner.*

JOSEPH L. SCHOFER, *Examiner.*